(12) United States Patent
Tartarelli et al.

(10) Patent No.: US 7,599,296 B2
(45) Date of Patent: Oct. 6, 2009

(54) METHOD OF TRANSMITTING DATA

(75) Inventors: Sandra Tartarelli, Heidelberg (DE); Albert Banchs, Heidelberg (DE)

(73) Assignee: NEC Corporation, Tokyo (JP)

(*) Notice: Subject to any disclaimer, the term of this patent is extended or adjusted under 35 U.S.C. 154(b) by 904 days.

(21) Appl. No.: 10/232,321

(22) Filed: Aug. 30, 2002

(65) Prior Publication Data

US 2003/0086413 A1 May 8, 2003

(30) Foreign Application Priority Data

Aug. 31, 2001 (DE) ............................. 101 42 426
Mar. 6, 2002 (DE) ............................. 102 09 705
May 6, 2002 (DE) ............................. 102 20 213

(51) Int. Cl.
*H04L 12/26* (2006.01)

(52) U.S. Cl. ................... 370/235.1; 370/235

(58) Field of Classification Search ............ 370/229, 370/230, 235, 252, 253, 389, 386, 428, 401–402, 370/232, 235.1, 395.41, 395.42, 395.5, 395.52, 370/231, 233, 237, 289, 412, 230.1, 248, 370/234, 395.21
See application file for complete search history.

(56) References Cited

U.S. PATENT DOCUMENTS

| | | | | |
|---|---|---|---|---|
| 5,267,232 A | * | 11/1993 | Katsube et al. | 370/230 |
| 5,313,454 A | * | 5/1994 | Bustini et al. | 370/231 |
| 6,252,848 B1 | * | 6/2001 | Skirmont | 370/229 |
| 6,548,435 B1 | * | 4/2003 | Bugajski | 501/109 |
| 6,633,540 B1 | * | 10/2003 | Raisanen et al. | 370/230.1 |
| 6,646,988 B1 | * | 11/2003 | Nandy et al. | 370/235 |
| 6,788,697 B1 | * | 9/2004 | Aweya et al. | 370/412 |
| 6,829,649 B1 | * | 12/2004 | Shorey et al. | 709/235 |
| 6,839,321 B1 | * | 1/2005 | Chiruvolu | 370/230.1 |
| 6,862,265 B1 | * | 3/2005 | Appala et al. | 370/235 |
| 6,865,185 B1 | * | 3/2005 | Patel et al. | 370/412 |
| 6,888,824 B1 | * | 5/2005 | Fang et al. | 370/359 |
| 6,901,593 B2 | * | 5/2005 | Aweya et al. | 718/104 |
| 6,904,015 B1 | * | 6/2005 | Chen et al. | 370/235 |
| 7,002,980 B1 | * | 2/2006 | Brewer et al. | 370/414 |
| 7,145,869 B1 | * | 12/2006 | Kadambi et al. | 370/229 |

FOREIGN PATENT DOCUMENTS

| | | |
|---|---|---|
| EP | 1 139 615 A1 | 10/2001 |
| JP | 2000-183880 A | 6/2000 |
| JP | 2001-358772 A | 12/2001 |
| WO | WO 00/57599 A2 | 9/2000 |

OTHER PUBLICATIONS

Makkar et al "Empirical Study of Buffer Management Scheme for Diffserv Assured Forwarding PHB", 2000 IEEE, pp. 632-637.

* cited by examiner

*Primary Examiner*—Brenda Pham
(74) *Attorney, Agent, or Firm*—Sughrue Mion, PLLC

(57) ABSTRACT

A method of transmitting data from customers (C1, C2, C3, C4, C5, C6, C7, C8, C9, C10) over a computer network, in particular over the Internet, where the data to be sent is split into packets, in particular into IP packets, where each packet is marked by one of at least two states (IN, OUT) and where the states (IN, OUT) determine which packets are dropped first, if packets are dropped during transmission, is, with regard to optimizing the drop rate of the packets, characterized in that the marking of the packet with a state of high drop precedence (OUT) is based on a random probability (p).

42 Claims, 4 Drawing Sheets

METHOD OF TRANSMITTING DATA

The invention relates to a method of transmitting data from customers over a computer network, in particular over the Internet, where the data to be sent is split into IP packets. We assume further that each packet is marked by one of at least two states (in and out) and the states determine which packets are dropped first, if packets are dropped during transmission due to network congestion.

Today, there are many different methods of transmitting data from a customer over a computer network. Data to be transmitted over the Internet is generally split into packets. If the data is transmitted via the IP protocol, it is split into Internet Protocol (IP) packets. In order to guarantee the smooth transmission of the packets over the network, i.e. without congestion, the packets can be marked by one of at least two states. The objective of these states is to determine which packets are dropped first and which packets are dropped last, if packets are dropped during transmission. Packet drops occur due to network congestion. In this case, packets marked with a high drop precedence (out packets) are discarded first while packets marked with a low drop precedence (in packets) have a higher probability of not being discarded.

Packets are marked at their entry into the network, i.e. At the edge node of an Internet Service Provider (ISP), for example. The packets are marked according to an algorithm that checks if the respective packet conforms to a specific condition, e.g. if the size of the packet is smaller than a specific number of bytes. Packets that do not conform to this condition are marked with the state where a packet is dropped first (out packets) in case of network congestion.

The described system of marking packets is especially problematic in that packets are only marked with a state of high drop precedence if the packet does not meet the condition. This is especially true if an algorithm contains the condition, as is usually the case, that a packet is marked with a high drop precedence if the packet exceeds an assigned maximum bandwidth during transmission. This means that packets marked with a high drop precedence are dropped when the assigned maximum bandwidth of the customer has already been exceeded. Marking packets with a high drop precedence only when packets are not conforming, allows to discard not conforming packets in case of congestion, but does not allow to prevent congestion.

SUMMARY OF THE INVENTION

The object of the present invention Is to provide a method of transmitting data of the kind mentioned in the beginning that aims at avoiding network congestion, by optimizing the way packets are marked at the edge router.

According to the present invention, this object is achieved by a data transmission method displaying the features of claim 1, characterized in that the marking of the packet with a state of high drop precedence is based on a random probability.

According to the present invention, by marking the packet on the basis of a random probability, packets can already be marked with a state of high drop precedence when the assigned maximum bandwidth is not exceeded. Consequently, packets can also be early dropped when the assigned maximum bandwidth is not exceeded during the transmission of the packet. If the packets are transported by the TCP protocol, early packet drops will cause the source to slow down the transmission rate (speed at which packets are sent into the network) and this allows to prevent network congestion. This provides a very advantageous and simple method of controlling and optimizing the bandwidth at which a customer sends data or the aggregate traffic of a customer.

With regard to guaranteeing an especially effective transmission, the marking of the packet with a high drop precedence is based on a single random probability for each customer, thereby minimizing the computational workload.

The nodes in a network are connected with each other through links. Several customers could share a link, in particular a line and/or a wireless connection or similar. In this case, one random probability for each customer is used to characterize the traffic he sends. The proposed method aims at optimizing the bandwidth experienced by each customer, unlike existing methods that attempt to maximize the total bandwidth on the link.

In other words, with traditional methods, It is more likely that one or more customers receive significantly more bandwidth than what he/they paid for at the expense of other customers. With the proposed method each customer should experience a bandwidth close to the value he paid for.

The links have maximum bandwidths and/or the customers could be assigned a maximum bandwidth for the data transmission. Such scenarios are frequent with ISPs and their customers, as charging and paying on the basis of an assigned maximum bandwidth is especially simple.

When a packet enters a network, a method is applied to decide whether the packet is conforming or not, that is to determine whether the bandwidth used by a customer exceeds or not the value the customer has paid for. The methods used to assess the conformity of a packet to a certain contract are called policers. One of the most common policers, is the token bucket. When a packet enters the network, a token bucket, characterized by a given token bucket size, is filled at a rate, corresponding to the bandwidth purchased by a customer. Both the size (also called depth) of the token bucket and the assigned bandwidth are generally part of the contract between an ISP and a customer.

Then, when a packet of a given size or length from the customer is received at the edge node, it is marked with a high drop precedence if the packet length (measured in bytes) exceeds the number of bytes of the token bucket, i.e. the token bucket occupancy. If there are enough bytes in the bucket for this packet, it is marked with a low drop precedence. If the packet is marked with a low drop precedence, a number of bytes equal to the packet length is subtracted from the token bucket. If a packet is marked with a high drop precedence, no bytes are subtracted from the token bucket. If the token bucket is empty, all packets are marked with a state of high drop.

At core nodes, all packets are put into the same buffer indenpendently of their marking (in/out). This buffer is managed in such a way that in case of congestion, out packets are dropped first. In this way, it is guaranteed that as long as the network is configured such that in packets alone do not cause congestion, in packets are never dropped.

The proposed invention enhances the standard token bucket as follows. When a packet arrives at an edge router, it enters a token bucket. If the size of the packet does not exceed the number of bytes in the token bucket, the packet (unlike in the standard token bucket) might still be marked as not conforming (high drop precedence) with a certain probability. In case of network congestion this packet will most likely be dropped (we refer to this drop as an early drop). The invention is based on the fact that, if packets are transported by the Transmission Control Protocol (TCP) (in particular Transmission Control Protocol/Internet Protocol, i.e. TCP/IP), then an early drop allows the source to slow down the transmission, before a serious level of congestion occurs. In other words, an early drop should prevent a situation in which many packets are dropped.

In a very simple embodiment, the packets could be forwarded in a Differentiated Services (DiffServ) environment DiffServ—also referred to as the DiffServ architecture—is a scalable way of providing Quality of Service (QoS) in the Internet. Scalability is achieved by moving complicated functionality toward the edge and leaving the core with very simple functionality. With DiffServ, packets are marked at the ingress of the network with a DiffServ codepoint (DSCP) and at the core they are given a forwarding treatment according to their DSCP. Each DSCP corresponds to a Per-Hop Behavior (PHB).

Two groups of PHB have been defined so far: PHB with Expedited Forwarding (EF) and PHB with Assured Forwarding (AF).

Service providers, especially ISPs, that offer DiffServ services, generally use Assured Forwarding (AF) to provide a service. With AF, the packets of a customer are forwarded with a very high probability as long as the aggregate traffic from the customer does not exceed the contracted bandwidth, i.e. the assigned maximum bandwidth. If the aggregate traffic exceeds the assigned maximum bandwidth, in case of network congestion, non conforming packets of the customer are discarded with high probability.

In general, charging for the transmission of data by a service provider is based on the contracted and assigned maximum bandwidth, therefore a customer would expect to receive a transmission rate at least equal to the assigned maximum bandwidth. In practice, AF used with TCP results in an average aggregate traffic that is substantially lower than the assigned maximum bandwidth. This is because TCP decreases its traffic when packets are dropped. The combination of TCP and AF therefore always results in the behavior described above if the assigned maximum bandwidth is exceeded. In some situations, this combination even results in a synchronized behavior of all the customer's TCP sources, that all decrease their sending rate at the same time. As a consequence, the customer's sending rate is oscillating, which results in a substantially lower traffic than the contracted bandwidth.

In DiffServ, the behavior of TCP transmission in combination with AP described above can be observed very frequently. If the sending rate exceeds the CIR (Committed Information Rate, referred elsewhere also as assigned maximum bandwidth), the token bucket is emptied and some packets are marked as out. Consequently, this marking leads to packets drops when the assigned maximum bandwidth is exceeded.

The marking algorithm could be extended to three levels of drop precedence. Such a solution would enable an especially high degree of differentiating packets. The levels of drop precedence might even be extended to any number.

At the core node, all packets are put into the same buffer independently of their marking. This buffer is managed in such a way that in case of congestion, packets marked with a high drop precedence are discarded first. One mechanism which is typically used to manage a buffer, so that high drop precedence packets are dropped first, is WRED (Weighted Random Early Detection). WRED guarantees that, as long as the network is configured such that packets marked with a low drop precedence alone do not cause packet congestion, these packets are never dropped.

TCP reacts to these drops by decreasing the traffic to a value lower than the assigned maximum bandwidth. If TCP does not detect any further packet drops, it increases the traffic again until the next packet drops occur. As a consequence, TCP's sending rate oscillates between the assigned maximum bandwidth and a value sometimes substantially lower, resulting in an average traffic lower than the assigned maximum bandwidth. This behavior is reduced substantially by marking the packets on the basis of an additional random probability.

To optimize the aggregate traffic, the random probability at a given time (step) could be expressed as $$p = k1 \times (b_{ref} - b) - k2 \times (b_{ref} - b_{old}) + p_{old}$$

where $p_{old}$ and $b_{old}$ are the values that respectively p and b had at the previous step (previous update time). To evaluate the next step, $p_{old}$ has to be set equal to p and $b_{old}$ equal to b. $b_{ref}$ is the desired token bucket occupancy, i.e. the value of the control loop to which we want to regulate in order to stabilize the traffic.

Every time a packet enters the token bucket, this probability is compared with a random number evenly distributed between 0 and 1. If the probability is greater than the random number, the packet is marked with a high drop precedence.

When stabilizing the token bucket occupancy, the change in the size of the TCP window could be expressed as $$\dot{w} = \frac{1}{R(t)} - \frac{W(t) \cdot W(t - R(t))}{2 \cdot R(t - R(t))} p(t - R(t)).$$

The change of value of the token bucket occupancy could be expressed as $$\dot{b} = -\frac{W(t)}{R(t)} N(t) + C,$$

where W(t) is the TCP window size, R(T) is the round-trip time (RTT), N(t) is the number of TCP sources of the customer and C is the assigned maximum bandwidth (also referred to as CIR elsewhere).

In order to stabilize the token bucket occupancy, we could linearize the change of value of the TCP window size and/or the token bucket occupancy at the operation point, assuming a constant round trip time $R_0$ and/or constant number of TCP sources N.

$$\delta \dot{W} = \frac{N}{R_0^2 C}(\delta W + \delta W(t - R_0)) - \frac{R_0 C^2}{2N^2} \delta p(t - R_0),$$

$$\delta \dot{b} = -\frac{N}{R_0} \delta W,$$

where $$\delta W = W - W_0$$

$$\delta b = b - b_0$$

$$\delta p = p - p_0.$$

The operation point $(W_0, b_0, p_0)$ is determined by imposing the conditions $\dot{W} = 0$ $\dot{b} = 0$. For the number of TCP sources we assume $N(t) = N$ and for the round trip time $R(t) = R_0$, i.e., they are constant.

Assuming that $$\frac{N}{R_0^2 C} \ll \frac{1}{R_0},$$

the transfer function of the control loop could be expressed as $$H(s) = -\frac{R_0 C^2}{2N^2} \frac{1}{s + \frac{2N}{R_0^2 C}} e^{-sR_0}.$$

This transfer function is obtained by performing a Laplace transform on the above differential equation.

In a very advantageous embodiment, the token bucket occupancy could be stabilized by a controller, especially a PI controller $$C(s) = K \frac{\frac{s}{z} + 1}{s}.$$

A PI controller with the value of C(s) obtained by performing a Laplace transform would have a maximum input transient and a high settling time, but no offset. Therefore, the PI controller is well fitted to stabilize the token bucket occupancy.

The transfer function of the open loop is expressed as follows:

$$L(j\omega) = e^{-j\omega R_0} \frac{C^2 K}{2N} \frac{\frac{j\omega}{z} + 1}{j\omega} \frac{1}{j\omega + \frac{2N}{R_0^2 C}}.$$

Assuming a range for the number of TCP sources of $N \geq N^-$ and a round-trip time (RTT) of $R_0 \geq R^+$, the objective is to select values for the constants K and z to stabilize the linear control loop.

To this end, we could select a control system constant greater than the TCP time constant and the zero for the controller could be chosen $$z = \omega_g = 0.1 \frac{2N^-}{R^{+2} C}.$$

The rationale behind the above choice is to have the controller dominate the closed-loop behavior, where the control constant is defined as $=1/\omega_g$ and the TCP time constant as $$\frac{2N^-}{R^{+2} C}.$$

By invoking the Nyquist stability criterion, the system is stable at $\omega_g$ for $$K = 0.007 \frac{(2N^-)^3}{(2R^+ C^2)^2}.$$

The Nyquist criterion defines when a system is stable for the highest frequency $\omega_g$. By imposing the equation $|L(j\omega_g)|=0.1$, we obtain the value for K.

By computing the equation for the phase difference, we obtain $$\angle L(j\omega_g) \geq -146° > -180°.$$

Consequently, the loop is stable for these values.

By performing a transformation from the Laplace domain into the z domain, preferably a bilinear transformation, we obtain k1 and k2 as $$k1 = K\left(\frac{T}{2} + \frac{1}{\omega_g}\right), k2 = -K\left(\frac{T}{2} - \frac{1}{\omega_g}\right),$$

where K is the gain in the controller and $\omega_g$ is the frequency domain of the system. T is the sampling time, defined for instance as the interarrival time, which is equal to the inverse maximum bandwidth 1/CIR, i.e. the customer is transmitting at his maximum contracted bandwidth.

There are different advantageous ways in which to apply and further develop the teachings of the present invention. To this end, please refer to the claims at the end of this document as well as to the description of preferred embodiments of the invented method with reference to drawings that follows. The description of preferred embodiments with reference to drawings also includes the generally preferred embodiments of the teachings.

BRIEF DESCRIPTION OF DRAWINGS

FIG. 1 shows a simulated scenario with two customers C1 and C2 sending data over an ISP to customers D1 and D2 in a DiffServ environment where the packets are sent via PHB with AF and WRED. C1 and C2 have agreed a maximum assigned bandwidth (CIR) of 10 Mbps with their ISP. In addition, customers C1 and C2 share a link of a maximum bandwidth of 20 Mbps, both sending 20 TCP flows each, with RTTs of 20 ms (C1) and 100 msec (C2).

According to the simulation results, in this exemplary embodiment the traffic of customers C1 and C2 are 9.83 and 8.32 Mbps each when using the known token bucket algorithm without an additional marking scheme on the basis of a random probability. Note that the traffic of customer C2 is substantially lower than the assigned maximum bandwidth CIR of 10 Mbps.

Figure 1:
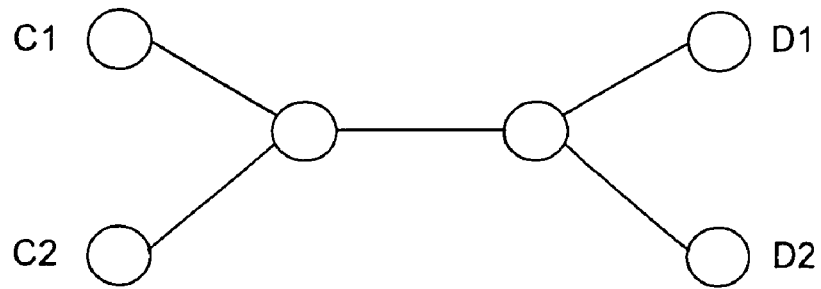
FIG. 1 in a scheme, an exemplary embodiment of a simulation of the transmission of data according to a known method and the invented method, FIG. 2 a schematic depiction of the known token bucket algorithm, FIG. 3 the evolution of the token bucket occupancy in a transmission according to a known method without a random probability, FIG. 4 a schematic flow diagram showing the marking of the packets according to the invented method, FIG. 5 a schematic block diagram of a linearized control loop to stabilize the token bucket occupancy, FIG. 6 the evolution of the token bucket occupancy in a transmission of data according to the invented method, FIG. 7 in a scheme, an additional exemplary embodiment of a simulation of the transmission of data according to known methods and the invented method, FIG. 8 the evolution of the achieved throughput as a function of the number of customers when using a known method as compared to the invented method, FIG. 9 the evolution of the total achieved link utilization as a function of the number of customers when using a known method as compared to the invented method and FIG. 10 the evolution of the achieved throughput as a function of the number of TCP data flows when using a known method as compared to the invented method.
Figure 2:
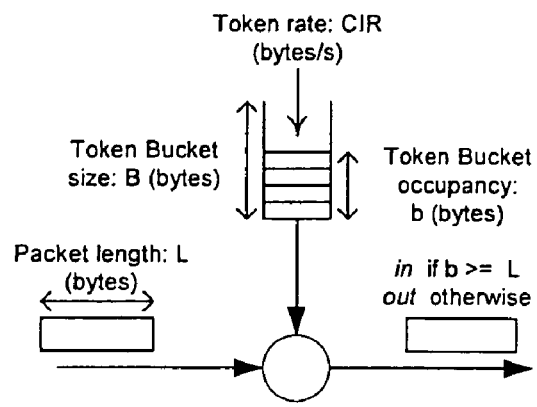

FIG. 2 shows a schematic depiction of the known token bucket algorithm. By means of this algorithm, the actual bandwidth is compared with the assigned maximum bandwidth, the CIR. When a packet enters the ISP's network, a token bucket of the size B is filled at the rate specified by the assigned maximum bandwidth CIR. Both the token bucket size B and the assigned maximum bandwidth CIR are part of the respective contract between the ISP and the customers C1 and C2.

Then, when a packet of the size of length L enters the token bucket, it is marked out (i.e. marked with a high drop precedence) if the token bucket occupancy b has less bytes than required. If there are enough bytes in the bucket for this packet, it is marked in, i.e. marked with a low drop precedence. In case of in marking, a number of bytes equal to the packet length L is subtracted from the token bucket occupancy b. If a packet is marked out because the token bucket occupancy b does not have enough bytes, no bytes are subtracted from the token bucket occupancy b.

Figure 3:
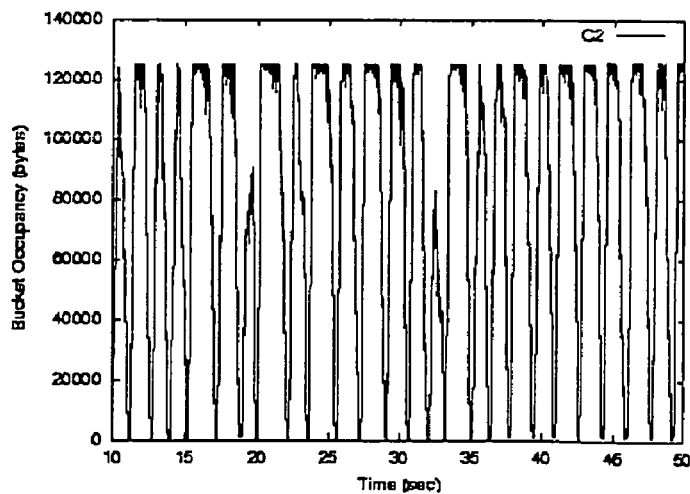

FIG. 3 plots the token bucket occupancy b for customer C2 if the packets are marked solely on the basis of the token bucket occupancy algorithm shown in FIG. 2. The plot shows the oscillating behavior of the TCP traffic aggregate. When the token bucket gets empty it is because the TCP traffic has increased its rate over the assigned maximum bandwidth CIR. In case of congestion. packets marked with a high drop precedence (out packets) are dropped. FIG. 3 clearly shows that TCP reacts to the drops by significantly decreasing its rate. At this point, the token bucket starts filling up again, i.e. the token bucket occupancy b increases. It is not until TCP increases its rate over the CIR again that the token bucket occupancy b decreases again. In the time period while the bucket is full the customer C2 is transmitting at a lower rate than the assigned maximum bandwidth CIR.

Figure 4:
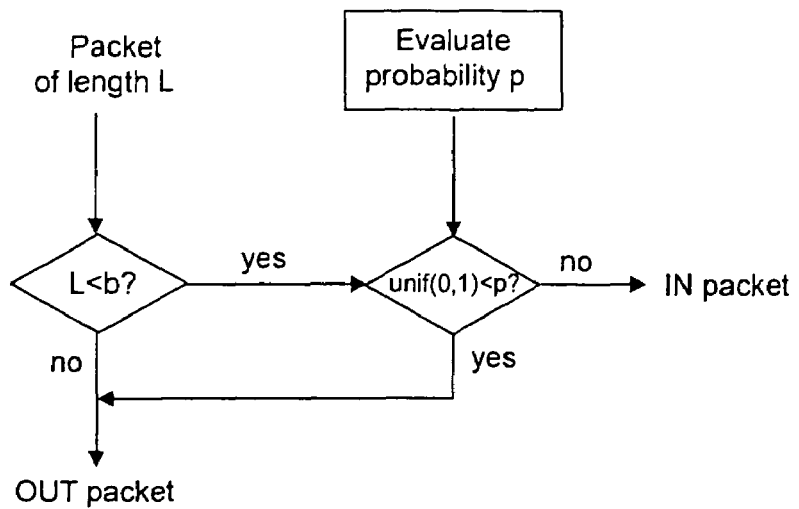

In FIG. 4, a flow diagram shows the marking of a packet according to the invented method. When the packet enters the network, the token bucket algorithm of FIG. 2 first checks if the packet is within the assigned maximum bandwidth CIR. To this end, the packet length L is compared with the token bucket occupancy b. If the value of the packet length L is greater than the value of the token bucket occupancy b, the packet is marked out. If the token bucket occupancy b has enough bytes, the random probability p determines whether the packet is marked in or out. Now, if the probability p is greater than a random number u evenly distributed between 0 and 1, the packet is marked out; otherwise it is marked in. If the token bucket is empty, all packets are marked out independently of the random probability p.

The problem of stabilizing the token bucket occupancy b can be achieved by an additional marking scheme on the basis of the random probability p. The problem of stabilizing the token bucket occupancy b can be expressed as having the time derivative of the token bucket occupancy b equal to 0:

$$\dot{b} = CIR - r(t) = 0,$$

where the token bucket occupancy b is greater than 0 and smaller than the token bucket size B, where b is the token bucket occupancy, B is the bucket size, r(t) is the sending rate of the customer and the CIR is the contracted maximum bandwidth of the customer.

The problem of stabilizing the buffer occupancy (in a queuing system) has been extensively studied in the context of Active Queue Management (AQM). The problem of stabilizing the token bucket occupancy b described above can be transformed into the problem of stabilizing the occupancy q of a queue of size B and capacity C (equal to CIR) filled at a rate r(t). Assuming constant round trip delays and that all out packets are dropped, the two problems are actually equivalent, which can be easily seen with the change of variable:

$$q = B - b.$$

While these schemes differ in details, they are similar at the architectural level. They monitor the evolution of the buffer occupancy and process this data with an algorithm to obtain a dropping probability for incoming packets. Different AQM schemes basically differ in the algorithm used to obtain the dropping probabilities.

For every incoming packet the probability p is computed as $$p = k1 \times (b_{ref} - b) - k2 \times (b_{ref} - b_{old}) + p_{old}$$

where $p_{old}$ and $b_{old}$ are the values that respectively p and b had at the previous step (previous update time). To evaluate the next step, $p_{old}$ has to be set equal to p and $b_{old}$ equal to b. $b_{ref}$ is the desired token bucket occupancy to which we want to regulate. Note that when marking out, no bytes are subtracted from the token bucket.

Figure 5:
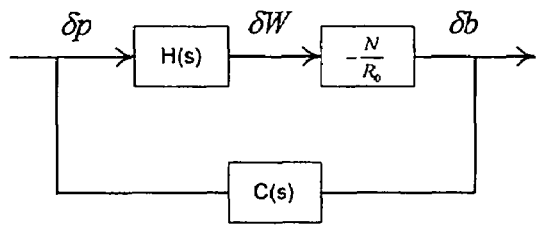

The stability of the token bucket occupancy b depends on the parameters k1 and k2. Therefore, the appropriate choice of k1 and k2 is key to achieve the performance objective. FIG. 5 shows a block diagram of a linearized control loop to stabilize the token bucket occupancy b, on the basis of which k1 and k2 are computed according to the algorithm already described.

Figure 6:
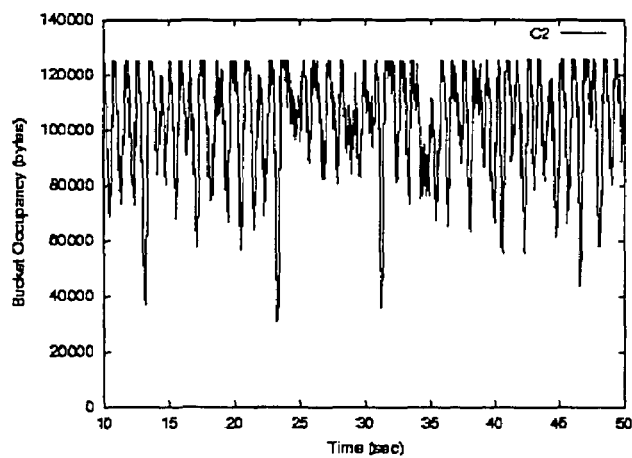

FIG. 6 depicts the token bucket occupancy b of customer C2 in case the data is transmitted according to the invented method, i.e. by using the random probability p. The token bucket occupancy stabilizes at a value of approx. $b_{ref} = 0.75$ B. The aggregate traffic obtained by customer C2 in this case is 9.65 Mbps, which is much closer to the assigned maximum bandwidth than the 8.32 Mbps obtained in the first simulation. Note that in FIG. 6, as compared to FIG. 3, the time intervals over which the token bucket is full are considerably shorter.

The objective of providing a throughput as close as possible to the assigned maximum bandwidth CIR can be reformulated as stabilizing the token bucket occupancy b around a reference value $b_{ref}$. In this specific exemplary embodiment $b_{ref} \not\in 0.75$ B. A constant not full token bucket occupancy b implies a sending rate of in packets approximately equal to the assigned maximum bandwidth CIR. Since in packets are very unlikely to be dropped, this leads to a throughput approximately equal to the assigned maximum bandwidth CIR.

The method according to the present invention therefore relies on early notifying TCP sources Of upcoming congestion via out marking based on the random probability p. In this way, the method according to the invention avoids synchronization among the TCP sources of C1 and C2, respectively, resulting in a better utilization of the contracted throughput and a better distribution of the total bandwidth in case customer C1 and C2 have contracted different CIRs. This results in a high level of fairness between customers C1 and C2.

One of the main advantage of the method according to the present invention is its simplicity. Instead of keeping state of each active connection, the method according to the invention only requires a small number of additional fixed and variable parameters for each token bucket. Another specific advantage is that its configuration does not require specific knowledge about the customer's traffic, but only a lower bound for the number of TCP sessions and an upper bound for the round trip time (RTT).

In the following we describe some simulation scenarios and their results to further explain the teachings according to the present invention. We continue assuming a DiffServ environment using a token bucket and a WRED queue. Such a scenario has proven very efficient in providing the agreed CIR in many simulated scenarios.

However, we observed that in a number of cases of interest in practice, such an architecture is not able to contrast fairness problems due to the TCP flow control mechanism. By employing the random probability, results can be significantly improved. In the present simulation scenarios, the discarding thresholds for conforming traffic in the WRED mechanism are set to a value that avoids in packets drops. Besides, the maximum threshold for packets marked out, $OUT_{max}$ is equal to 10. Finally, for simulations of the method according to present invention, the instantaneous queue length for the AQM mechanism is taken into account, so that the system reacts faster to the early marking. Simulations were run using ns-2.

In the following we first show some simulation results we obtained by considering a number of heterogeneous scenarios. In the first three scenarios we assumed a fully subscribed link, i.e. the sum of the CIRs is equal to the bottleneck capacity. In contrast, In the fourth scenario we explored the behavior when the link is only partially subscribed. We conclude the section by evaluating the performance of the proposed marking scheme as a function of different parameters. All simulations were run using TCP Reno.

Figure 7:
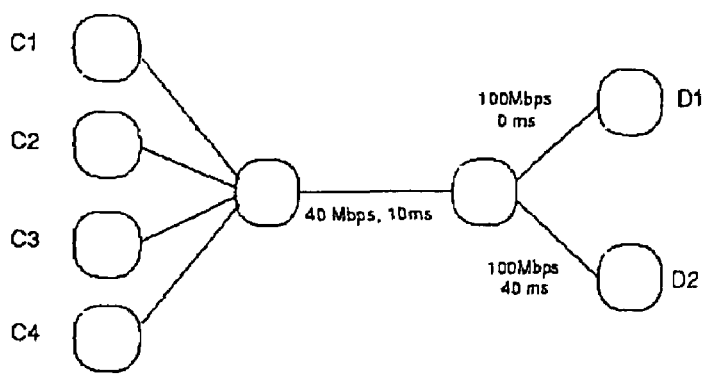

The first scenario is depicted in FIG. 7 and described by Table 1. The access links do not introduce either delays or packet drops. It is known that non-responsive User Datagram Protocol (UDP) traffic causes problems of fairness when interacting with TCP flows. Therefore, in this scenario we study the interaction between customers transmitting either TCP only flows or mixed TCP and UDP traffic. To model UDP traffic, we considered Constant Bit Rate (CBR) flows, each sending at 1.5 Mbps. In this case the UDP rate sums up to 75% of the agreed CIR.

TABLE 1

| | CIR (Mbps) | # of flows TCP | # of flows UDP | RTT (ms) | no p (Mbps) | p (Mbps) |
|---|---|---|---|---|---|---|
| Total | — | — | — | — | 37.88 | 39.47 |
| C1 | 10 | 10 | 0 | 20 | 9.46 | 10.10 |
| C2 | 10 | 10 | 0 | 100 | 7.99 | 9.05 |
| C3 | 10 | 10 | 5 | 20 | 10.35 | 10.21 |
| C4 | 10 | 10 | 5 | 100 | 10.06 | 10.09 |

Table 1 reports some settings we selected for this test and in the last two columns it shows the results in terms of traffic for the standard method and the method according to the present invention respectively. Table 1 also shows that using the random probability p helps customers sending TCP flows only to receive a higher share of the total bandwidth. In particular C1, characterized by a small RTT, achieves the agreed CIR while C2 gets more than 90% of it, against the 80% allowed by the standard method.

In a second scenario we assume heterogeneous values for the maximum assigned bandwidth CIR. A fairness problem also arises when different customers contract heterogeneous values for the assigned maximum bandwidth CIR. In fact, those customers characterized by a lower CIR value are favored in achieving the agreed CIR. The following scenario is an example of this behavior. The bottleneck link speed is set equal to 22 Mbps. Table 2 shows that in the considered case, the method according to the present invention allows to improve the overall link utilization by more than 15% and above all it leads to a significantly more fair bandwidth distribution.

TABLE 2

| | CIR (Mbps) | # of flows TCP | RTT (ms) | no p (Mbps) | p (Mbps) |
|---|---|---|---|---|---|
| Total | — | — | — | 18.18 | 21.62 |
| C1 | 10 | 10 | 20 | 8.63 | 10.16 |
| C2 | 10 | 10 | 100 | 7.07 | 9.23 |
| C3 | 1 | 10 | 20 | 1.43 | 1.16 |
| C4 | 1 | 10 | 100 | 1.03 | 1.06 |

In a third simulation scenario we investigate the influence of the number of customers. When the number of customers and of flows grows to high values, then the multiplexing gain has a positive effect towards better link utilization and bandwidth distribution, even when the standard token bucket is used. The bottleneck link speed is set equal to 100 Mbps. In Table 3 we show simulation results that confirm this. However, also in this case, the method according to the present invention slightly improves the overall performance.

TABLE 3

| | CIR (Mbps) | # of flows TCP | RTT (ms) | no p (Mbps) | p (Mbps) |
|---|---|---|---|---|---|
| Total | — | — | — | 97.17 | 98.63 |
| C1 | 10 | 40 | 20 | 10.36 | 10.58 |
| C2 | 10 | 10 | 100 | 9.16 | 9.25 |
| C3 | 10 | 10 | 20 | 9.91 | 10.10 |
| C4 | 10 | 40 | 100 | 10.11 | 10.27 |
| C5 | 10 | 20 | 20 | 10.20 | 10.33 |
| C6 | 10 | 20 | 100 | 9.79 | 9.89 |
| C7 | 10 | 15 | 20 | 10.11 | 10.25 |
| C8 | 10 | 15 | 100 | 9.47 | 9.66 |
| C9 | 10 | 5 | 20 | 8.88 | 9.05 |
| C10 | 10 | 10 | 100 | 9.14 | 9.22 |

In a fourth simulation, we investigate the interaction among customers with only TCP flows or only UDP flows respectively in an under-subscribed link. We considered a link speed of 53 Mbps, while $$\sum_{i=1}^{4} CIR_i = 40 \text{ Mbps (75\% subscribed link)}.$$

C3 and C4 transmit both 10 CBR flows, each at a rate of 1.5 Mbps, i.e. their sending rate is slightly above the CIR.

TABLE 4

| | CIR (Mbps) | # of flows TCP + UDP | RTT (ms) | no p (Mbps) | p (Mbps) |
|---|---|---|---|---|---|
| Total | — | — | — | 49.56 | 51.31 |
| C1 | 10 | 10 + 0 | 20 | 11.34 | 14.30 |
| C2 | 10 | 10 + 0 | 100 | 9.72 | 10.48 |
| C3 | 10 | 0 + 10 | 20 | 14.25 | 13.44 |
| C4 | 10 | 0 + 10 | 100 | 14.24 | 13.08 |

Table 4 shows that the method according to the present invention allows TCP to obtain a significantly higher share of the excess bandwidth as compared to the standard approach. This is especially true for more aggressive TCP customers such as C1, which has a smaller RTT, while C2 having a relatively small number of data flows and a large RTT (respectively 10 and 100 ms) can only achieve the assigned maximum bandwidth CIR.

In the following we investigate the benefit offered by the method according to the present invention as a function of the number of customers, To this end, we considered again the setting implemented for the third scenario. We evaluated the throughput achieved respectively by C1 and C2 as a function of the total number of customers. Customer C1 is characterized by a low RTT and a large number of data flows, therefore it is very likely that he will achieve the assigned maximum bandwidth CIR. Customer C2 on the contrary has a large RTT and a relatively small number of flows, thus he is penalized in the bandwidth sharing. In this simulation, we always considered the first n customers in Table 3 for a scenario with n customers.

Figure 8:
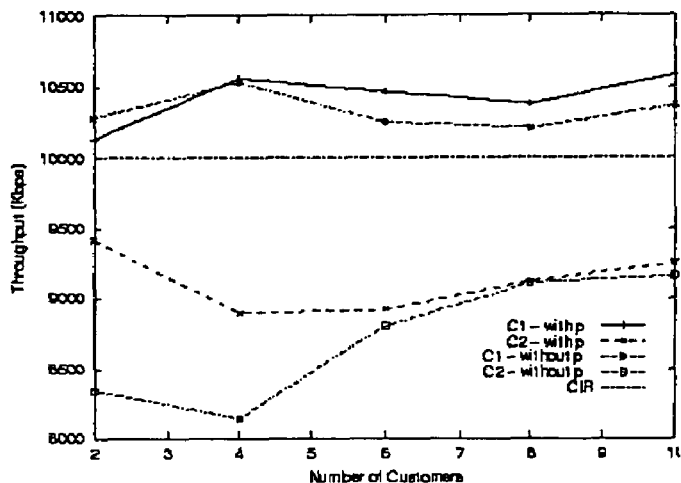

In FIG. 8 we compare the throughput obtained by C1 and C2 when using the method according to the present invention and a standard token bucket. The method according to the present invention always allows to achieve the best performance. However, the most significant improvement is achieved by customer C2 when the total number of customers is below 8. By employing the method according to the present invention, customer C2 always obtains at least 90% of the assigned maximum bandwidth CIR, while the standard token bucket considerably penalizes it when the total number of customers is low. The latter case is generally common for ISP access links.

Figure 9:
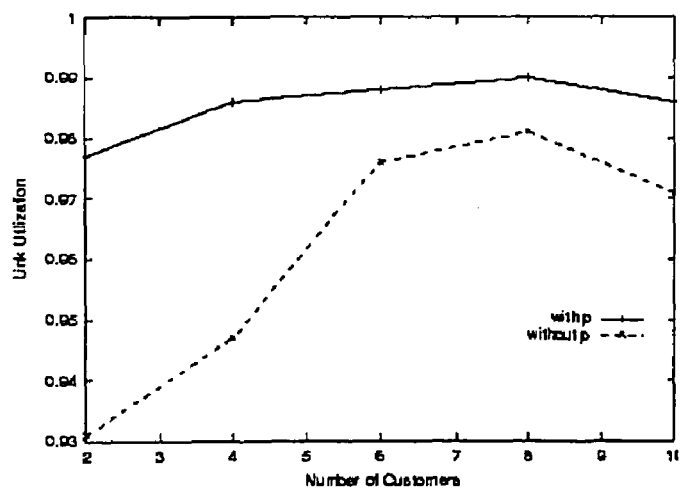

In addition, we also evaluated the total link utilization for the third simulation. The results are reported in FIG. 9. The improvement due to the method according to the present invention is considerable.

We now consider the effect of a low number of flows per customer, of the order of a few units (for instance home users). In particular we analyze the performance of a scenario with 10 customers, each transmitting 10 flows, except for one customer that sends a smaller number of flows. All customers are assigned a CIR of 10 Mbps, the RTT varies for the different customers between 20 and 100 ms and the bottleneck speed link is equal to 100 Mbps.

Figure 10:
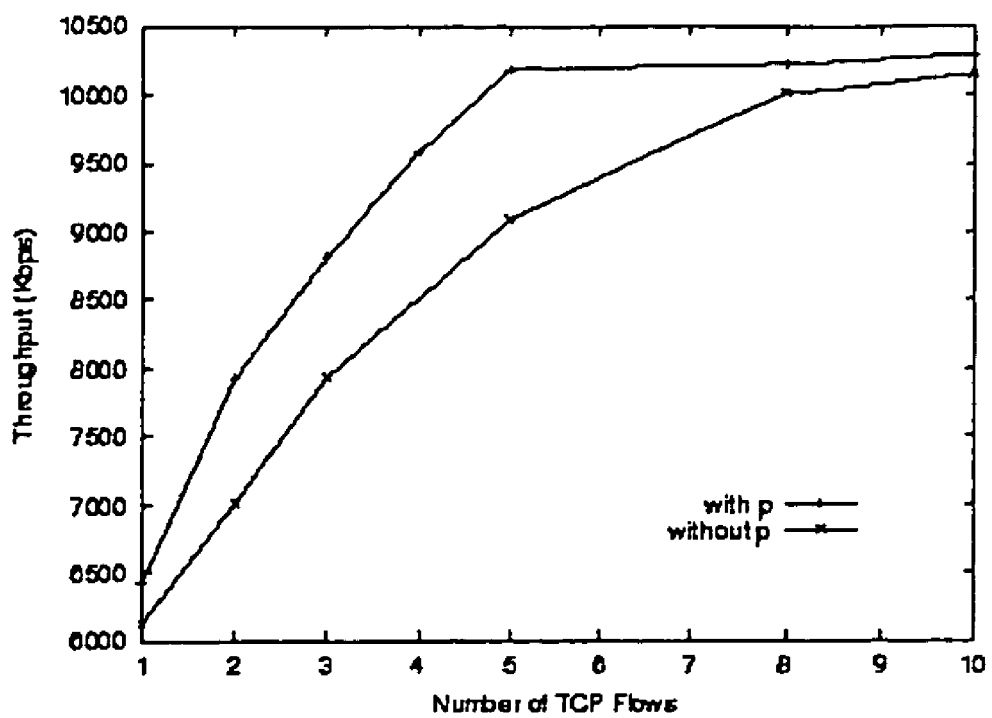

For the customer sending a small number of flows we evaluate the achieved throughput as a function of the number of flows, when employing the method according to the present invention as compared to the standard token bucket. Results are reported in FIG. 10. As expected, when the number of flows is small, the throughput obtained is significantly lower than the assigned maximum bandwidth CIR. However by using the method according to the present invention we observe a relevant improvement. In this simulation, by transmitting 5 flows, the customer already obtains the assigned maximum bandwidth CIR, while when no early marking is applied, the throughput achieved is still 10% lower than the assigned maximum bandwidth CIR.

With regard to additional advantageous embodiments of the teaching according to the invention, in order to avoid repetition, please refer to the general section of the description as well as to the claims at the end of this document.

Finally, we would like to point out explicitly that the exemplary embodiments described above only serve to describe the teaching claimed by are not limited to the exemplary embodiments.

| List of Reference Characters and Definitions | |
|---|---|
| b | token bucket occupancy |
| $b_{old}$ | old token bucket occupancy |
| $b_{ref}$ | value to which the token bucket occupancy is to be regulated |
| B | token bucket size |
| CIR | assigned maximum bandwidth |
| C1, C2 ... C10 | customers (senders) |
| D1, D2 | customers (recipients) |
| IN | state of low drop precedence |
| K | gain in the controller |
| L | packet length |
| N | number of TCP sources |
| OUT | state of high drop precedence |
| P | probability |
| $P_{old}$ | old probability |
| R, RTT | round trip time |
| u | evenly distributed random number |
| W | TCP window size |
| z | zero of controller |
| $\omega_g$ | maximum frequency |
| AF | Assured Forwarding |
| AQM | Active Queue Management |
| CBR | Constant Bit Rate |
| DiffServ | Differentiated Services |
| DSCP | Differentiated Services Codepoint |
| IP | Internet Protocol |
| ISP | Internet Service Provider |
| PHB | Per Hop Behavior |
| QoS | Quality of Service |
| TCP | Transmission Control Protocol |
| WRED | Weighted Random Early Detection |

The invention claimed is:

1. A method of transmitting data from customers over a computer network in packets, the method comprising:
   marking each of said packets by a first state or a second state by a network device;
   wherein said first state has a high drop precedence and is based on a random probability (p) calculated with reference to a previous random probability and a previous token bucket occupancy;
   wherein the packet is marked by a first state if a length of the packet is above a token bucket occupancy of a token bucket; and
   wherein the probability (p) at a given step is expressed as $$p = k1 \times (b_{ref} - b) - k2 \times (b_{ref} - b_{old}) + p_{old}$$

and that at a next step $p_{old}$ is set equal to p and $b_{old}$ is set equal to b, wherein $p_{old}$ and $b_{old}$ are values that are respectively the values p and b had at a previous update time,
   $b_{ref}$ is a desired token bucket occupancy,
   b is a total bucket size,
   k1 is a constant, and
   k2 is a constant.

2. The method of claim 1, wherein the marking of the packet with a high drop precedence is based on a single random probability.

3. The method of any of claims 1 or 2, wherein the probability (p) is measured for the traffic of each of said customer.

4. The method of any of claims 1 or 2, wherein the computers of the network are linked with each other.

5. The method of claim 4, wherein several of said customers share at least parts of a link.

6. The method of claim 4, wherein the links have maximum bandwidths or the customers have been provided an assigned maximum bandwidth for the purpose of data transmission.

7. The method of claim 6, wherein the traffic of at least one of said the customers is measured.

8. The method of claim 6, wherein a packet is dropped when an assigned maximum bandwidth is exceeded during the transmission or the maximum bandwidth of the connection is not sufficient to transmit the packets.

9. The method of claim 6, wherein the marking of the packet is based on the comparison of the current bandwidth with the assigned maximum bandwidth.

10. The method of claim 9, wherein the comparison of the current bandwidth with the assigned maximum bandwidth is based on a token bucket.

11. The method of claim 6, wherein the packet is marked with a high drop precedence if the current bandwidth is higher than the assigned maximum bandwidth.

12. The method of any of claims 1 or 2, further comprising transmitting said data via a TCP transport protocol.

13. The method of any of claims 1 or 2, wherein the packets are forwarded in a DiffServ environment.

14. The method of any of claims 1 or 2, wherein the marking is done by means of two states.

15. The method of any of claims 1 or 2, wherein the probability (p) is compared to a random number (u) evenly distributed between 0 and 1.

16. The method of claim 15, wherein the packet is marked with a high drop precedence if the probability (p) is greater than the random number (u).

17. The method of any of claims 1 or 2, wherein the packets are put into a buffer assigned to a core node.

18. The method of any of claims 1 or 2, wherein, in case of packet congestion during transmission, the packets are marked with a high drop precedence are discarded.

19. The method of any of claims 1 or 2, further comprising stabilizing the token bucket occupancy by linearizing the change in a TCP window size, wherein the change in the TCP window size (w) is expressed as $$\dot{w} = \frac{1}{R(t)} - \frac{W(t) \cdot W(t-R(t))}{2 \cdot R(t-R(t))} p(t-R(t)),$$

wherein
R(t) is a round trip time as a function of time, and
W(t) is a TCP window size as function of time.

20. The method of any of claims 1 or 2, further comprising stabilizing the token bucket occupancy by linearizing the change in a token bucket occupancy, wherein the change in the token bucket occupancy (b) is expressed as $$\dot{b} = -\frac{W(t)}{R(t)} N(t) + C,$$

wherein
N(t) is a number of TCP sources of the customer as a function of time,
W(t) is a TCP window size as function of time,
R(t) is the round trip time as a function of time, and
C is an assigned maximum bandwidth.

21. The method of claim 19, wherein the change in a TCP window size (W) is linearized in an operation point, preferably at constant round trip time ($R_o$) or constant number of TCP sources (N) expressed as $$\delta \dot{W} = \frac{N}{R_0^2 C}(\delta W + \delta W(t-R_0)) - \frac{R_0 C^2}{2N^2} \delta p(t-R_0),$$

$$\delta \dot{b} = -\frac{N}{R_0} \delta W,$$

where $$\delta w = w - w_o$$

$$\delta b = b - b_o$$

$$\delta p = p - p_o,$$

C is an assigned maximum bandwidth, b is a token bucket occupancy,
W is a TCP window size, and
$w_o$, $b_o$, and $p_o$ are determined by setting W=0 and b=0.

22. The method of any of claim 1 or 2, wherein the token bucket occupancy (b) is stabilized by way of a controller whose transfer function is expressed as $$C(s) = K \frac{\frac{s}{z} + 1}{s},$$

wherein
C(s) is a controller transfer function,
s is a LaPlace parameter,
z is a zero of the controller, and
K is a constant.

23. The method of claim 22,
wherein a zero of the controller is to $$z = \omega_g = 0.1 \frac{2N^-}{R^{+2}C}$$

in order to have the controller dominate the closed-loop behavior,
wherein
$\omega_g$ is a maximum frequency,
N– is a minimum in a range for a number of TCP sources where N≧N–,
R+ is a maximum range of round-trip time ($R_o$) where $R_o \leq R+$, and
C is an assigned maximum bandwidth.

24. The method of claim 22, wherein especially by invoking a Nyquist criterion a gain (K) in the controller is set to $$K = 0.007 \frac{(2N^-)^3}{(2R^+C^2)^2},$$

wherein
N– is a minimum in a range for a number of TCP sources where N≧N–,
R+ is a maximum range of round-trip time ($R_o$) where $R_o \leq R+$, and
C is an assigned maximum bandwidth.

25. The method of claim 1, wherein k1 is computed by a bilinear transformation expressed as $$k1 = K\left(\frac{T}{2} + \frac{1}{\omega_g}\right),$$

wherein
K is a constant,
T is a sampling time, and
$w_g$ is an inverse of a control constant.

26. The method of claim 1, wherein a k2 is computed by a bilinear transformation expressed as $$k2 = -K\left(\frac{T}{2} - \frac{1}{\omega_g}\right),$$

wherein
K is a constant,
T is a sampling time, and
$w_g$ is an inverse of a control constant.

27. The method of claim 1, wherein the computers of the network are linked with each other.

28. The method of claim 5, wherein the links have maximum bandwidths or the customers have been provided an assigned maximum bandwidth for the purpose of data transmission.

29. The method of claim 7, wherein the links have maximum bandwidths or the customers have been provided the assigned maximum bandwidth for the purpose of data transmission.

30. The method of claim 7, wherein the marking of the packet is based on the comparison of the current bandwidth with the assigned maximum bandwidth.

31. The method of claim 8, wherein the marking of the packet is based on the comparison of the current bandwidth with the assigned maximum bandwidth.

32. The method of claim 7, wherein the packet is marked with a high drop precedence if the current bandwidth is higher than the assigned maximum bandwidth.

33. The method of claim 8, wherein the packet is marked with a high drop precedence if the current bandwidth is higher than the assigned maximum bandwidth.

34. The method of claim 9, wherein the packet is marked with a high drop precedence if the current bandwidth is higher than the assigned maximum bandwidth.

35. The method of claim 10, wherein the packet is marked with a high drop precedence if the current bandwidth is higher than the assigned maximum bandwidth.

36. The method of claim 20, wherein the change in the token bucket occupancy (b) is linearized in an operation point, preferably at constant round trip time ($R_o$) or constant number of TCP sources (N) expressed as $$\delta \dot{W} = \frac{N}{R_0^2 C}(\delta W + \delta W(t - R_0)) - \frac{R_0 C^2}{2N^2}\delta p(t - R_0), \; \delta \dot{b} = -\frac{N}{R_0}\delta W,$$

where $\delta w = w - w_o$ $\delta b = b - b_o$ $\delta p = p - p_o$, and

C is an assigned maximum bandwidth, W is a TCP window size and
wo, bo, and po are determined by setting Ẇ=0 and ḃ=0.

37. The method of claim 23, wherein by invoking a Nyquist criterion a gain (K) in the controller is set to $$K = 0.007\frac{(2N^-)^3}{(2R^+ C^2)^2}\bullet,$$

wherein
N− is a minimum in a range for a number of TCP sources where N≧N−,
R+ is a maximum range of round-trip time ($R_o$) where $R_o$≦R+, and
C is an assigned maximum bandwidth.

38. The method of claim 23, wherein a k1 is computed by a transformation expressed as $$k1 = K\left(\frac{T}{2} + \frac{1}{\omega_g}\right)\bullet,$$

wherein
K is a constant,
T is a sampling time, and
$w_g$ is an inverse of a control constant.

39. The method of claim 24, wherein k1 is computed by a transformation expressed as $$k1 = K\left(\frac{T}{2} + \frac{1}{\omega_g}\right)\bullet,$$

wherein
K is a constant,
T is a sampling time, and
$w_g$ is an inverse of a control constant.

40. The method of claim 23, wherein k2 is computed by a transformation expressed as $$k2 = -K\left(\frac{T}{2} - \frac{1}{\omega_g}\right)\bullet$$

wherein
K is a constant,
T is a sampling time, and
$w_g$ is an inverse of a control constant.

41. The method of claim 24, wherein k2 is computed by a transformation expressed as $$k2 = -K\left(\frac{T}{2} - \frac{1}{\omega_g}\right)\bullet,$$

wherein
K is a constant,
T is a sampling time, and
$w_g$ is an inverse of a control constant.

42. The method of claim 25, wherein k2 is computed by a preferably bilinear transformation expressed as $$k2 = -K\left(\frac{T}{2} - \frac{1}{\omega_g}\right)\bullet,$$

wherein
K is a constant,
T is a sampling time, and
$w_g$ is an inverse of a control constant.

* * * * *